US009843179B1

(12) United States Patent
Sovel

(10) Patent No.: US 9,843,179 B1
(45) Date of Patent: Dec. 12, 2017

(54) CORROSION RESISTANT TERMINATION CONNECTOR FOR STEEL WIRE ROPE/MINESWEEPING CABLE

(71) Applicant: James E. Sovel, Panama City Beach, FL (US)

(72) Inventor: James E. Sovel, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1059 days.

(21) Appl. No.: 13/863,754

(22) Filed: Apr. 16, 2013

(51) Int. Cl.
*H02G 15/02* (2006.01)

(52) U.S. Cl.
CPC .................................. *H02G 15/025* (2013.01)

(58) Field of Classification Search
None
See application file for complete search history.

(56) References Cited

U.S. PATENT DOCUMENTS

| | | | | |
|---|---|---|---|---|
| 2,161,608 A * | 6/1939 | Bariffi | ..................... | D06F 37/24 210/365 |
| 2,209,620 A * | 7/1940 | Berndt | ..................... | H01R 4/52 174/74 R |
| 2,449,570 A * | 9/1948 | Violette | ................. | H01R 13/53 174/359 |
| 3,681,512 A * | 8/1972 | Werner | ..................... | H01R 4/08 102/202.9 |
| 3,996,417 A * | 12/1976 | Annas | ....................... | H01R 4/20 16/108 |
| 4,252,992 A * | 2/1981 | Cherry | ..................... | F16G 11/04 174/84 R |
| 4,500,151 A * | 2/1985 | Ayers | .................... | H01R 13/523 174/76 |
| 4,509,151 A * | 4/1985 | Anderson | ................. | G01V 1/20 367/118 |
| 4,521,642 A * | 6/1985 | Vives | ...................... | H02G 1/145 156/49 |
| 4,524,324 A * | 6/1985 | Dickinson, III | ........ | E21B 23/10 166/250.17 |
| 4,776,255 A * | 10/1988 | Smith | ...................... | F41H 11/14 89/1.11 |
| 5,174,515 A * | 12/1992 | Meier | ................... | B25J 19/0029 242/388 |
| 5,234,515 A * | 8/1993 | Sekkelsten | ............... | H01R 4/70 156/158 |

(Continued)

*Primary Examiner* — Jeremy C Norris
*Assistant Examiner* — Muhammed Azam
(74) *Attorney, Agent, or Firm* — James T. Shepherd

(57) ABSTRACT

A corrosion resistant termination connector for connecting to a steel wire rope and a modular fitting for use on a magnetic influence minesweeping cable is provided. The connector body is made of a high strength composite material, and has a common channel. The body has three sections: A ribbed annular stem, an abutment band with uniform edges for forming sealing occlusions, and an externally threaded spelter socket with a conical channel. Strands of the wire rope are splayed and adhesively joined with a mixture of thermosetting resins forming a conical wedge that secures the rope within the conical channel. The modular fitting is screwed on the elongate socket section, and includes a pin with a thimble. A molded insular cover seals the steel wire rope and the ribbed stem.

21 Claims, 7 Drawing Sheets

(56) References Cited

U.S. PATENT DOCUMENTS

| | | | | |
|---|---|---|---|---|
| 5,274,603 A * | 12/1993 | Zibilich, Jr. | G01V 1/201 | 174/101.5 |
| 5,514,836 A * | 5/1996 | Delalle | H01R 4/22 | 174/74 R |
| 5,801,465 A * | 9/1998 | Yamada | H01R 13/523 | 174/77 R |
| 6,489,562 B1 * | 12/2002 | Hess | A61N 1/056 | 174/84 R |
| 6,554,636 B2 * | 4/2003 | Walker et al. | H01R 13/523 | 174/86 |
| 6,736,545 B2 * | 5/2004 | Cairns | G02B 6/3816 | 174/74 R |
| 6,809,265 B1 * | 10/2004 | Gladd | H02G 15/085 | 174/74 R |
| 7,154,038 B2 * | 12/2006 | Studer | H01B 7/18 | 174/36 |
| 7,219,425 B2 * | 5/2007 | Pasini | H01R 4/08 | 174/90 |
| 7,388,152 B2 * | 6/2008 | Cairns | H01B 7/28 | 174/74 R |
| 8,097,804 B1 * | 1/2012 | Briski | H02G 3/20 | 174/36 |
| 8,637,774 B2 * | 1/2014 | Hiner | H01R 4/70 | 174/138 F |
| 8,653,366 B2 * | 2/2014 | Quesnel | H02G 7/056 | 174/74 R |
| 8,746,988 B2 * | 6/2014 | Yu | G02B 6/3887 | 174/70 R |
| 9,246,282 B1 * | 1/2016 | Sovel | H01R 9/05 | |
| 9,318,239 B2 * | 4/2016 | Sovel | H01B 7/2806 | |
| 2004/0194995 A1 * | 10/2004 | Pasini | H01R 4/08 | 174/88 R |
| 2006/0124339 A1 * | 6/2006 | Goehlich | H02G 15/003 | 174/74 R |
| 2007/0216233 A1 * | 9/2007 | Braun | H01R 4/48 | 310/12.09 |
| 2008/0155344 A1 * | 6/2008 | Ko | G11B 15/52 | 714/42 |
| 2009/0102764 A1 * | 4/2009 | Chen | G09G 3/003 | 345/87 |
| 2009/0235629 A1 * | 9/2009 | Bosman | B63B 21/20 | 57/255 |
| 2011/0048762 A1 * | 3/2011 | Sawamura | B60R 16/0207 | 174/78 |
| 2011/0155459 A1 * | 6/2011 | Nicholson | H02G 15/14 | 174/77 R |
| 2011/0278062 A1 * | 11/2011 | Varkey | H01B 13/141 | 174/70 R |
| 2011/0297441 A1 * | 12/2011 | Quesnel | H02G 7/056 | 174/84 C |
| 2012/0018213 A1 * | 1/2012 | Gomez Vanegas | H02G 7/22 | 174/45 R |
| 2012/0024599 A1 * | 2/2012 | Yamashita | B60R 16/0215 | 174/74 R |
| 2012/0037419 A1 * | 2/2012 | Mech | H02G 15/06 | 174/77 R |
| 2012/0076318 A1 * | 3/2012 | Aase | H01B 13/0013 | 381/74 |
| 2012/0138361 A1 * | 6/2012 | Elliott | H01R 9/05 | 174/74 R |
| 2012/0234597 A1 * | 9/2012 | Madden | H02G 9/12 | 174/74 R |
| 2013/0043072 A1 * | 2/2013 | Khansa | H01R 4/203 | 174/74 R |
| 2013/0112475 A1 * | 5/2013 | Magno, Jr. | H02G 15/013 | 174/77 R |
| 2013/0255986 A1 * | 10/2013 | Price | F16L 11/22 | 174/47 |
| 2014/0060928 A1 * | 3/2014 | Skeet | H02G 15/043 | 174/77 R |
| 2014/0202765 A1 * | 7/2014 | Faulkner | H02G 1/08 | 174/75 R |
| 2014/0262496 A1 * | 9/2014 | Burrow | H01R 4/206 | 174/74 R |
| 2015/0255974 A1 * | 9/2015 | Burrow | E21B 17/028 | 174/77 R |
| 2015/0380128 A1 * | 12/2015 | Josefsson | H01B 1/22 | 174/120 SC |

* cited by examiner

CORROSION RESISTANT TERMINATION CONNECTOR FOR STEEL WIRE ROPE/MINESWEEPING CABLE

STATEMENT OF GOVERNMENT INTEREST

The invention described herein may be manufactured and used by or for the Government of the United States of America for Governmental purposes without the payment of any royalties.

BACKGROUND OF THE INVENTION

1. Field of the Invention

The present invention relates generally to a wire rope termination connector, and in particular to a wire rope termination connector for terminating a core wire rope in a coaxial cable, such as a minesweeping magnetic influence cable, where the core wire rope is a strength member that is subject to corrosion, including salt water, such as seawater, conducting a current. The invented termination connector is resistant to corrosion, typically environmentally isolates the strength member, typically electrically insulating, and adaptable for a variety of modular fittings that include metal such as stainless steel and polymeric materials such as engineering plastics.

2. Prior Art

There are many types of termination connectors for wire rope, where almost all termination connectors are metallic, usually steel. Those connectors having good corrosion resistance are stainless steel spelter sockets, which typically use zinc, in part because zinc has a more negative electrochemical potential than steel, and it has a lower melting point.

The art teaches that the process of forming a zinc spelter socket includes that the socket be filled with molten zinc. The melting point for zinc is around 790° F. The process includes applying a tight wire serving band at the point where the socket base will be. The individual strands of the wire rope are unwound, straightened, and evenly spread so that they form an included angle of approximately 60 degrees. The angle has to be sufficiently wide that individual strands can be properly accessed as they are cleaned.

A fibrous core is cut out and positioned as close to the serving band as possible prior to cleaning the strands. The strands are typically cleaned with a chlorinated solvent such as 1-1-1 trichloroethane, perchloroethane, and perchloroethylene. These solvents are used because they cut grease, but more importantly they are not flammable and dry quickly. A muriatic acid wash is also recommended. Muriatic acid is the common name for hydrochloric acid. The wash typically causes the acid to fume. The acid is neutralized in a solution of bicarbonate, giving off carbon dioxide and sodium chloride.

The rope is then dipped in a flux of zinc-ammonium chloride flux heated to 200° F. The flux is used to remove oxide films, promote wetting, and prevent re-oxidation of the surfaces during heating. The strands of wires are then pointed downward until the wires have dried thoroughly. The wires are compressed in a clamp/vise, a tight bundle which will permit the wires to be slipped into the socket. Before threading, the entire socket is heated to dispel any residual moisture and will also prevent the zinc from freezing or cooling prematurely. The heating also expands the entrance of the socket.

The socket should never be heated after the rope has been slid into the socket, as the heat may cause damage to the rope. Warm the socket, and then thread the rope into the socket. The strands of wire are distributed evenly in the socket basket so the molten zinc can surround each wire. Extreme care is used to align the rope in the center of the socket. Next the socket base is sealed with fire clay or putty. The seal material should not penetrate into the socket base. If the seal material does penetrate it could prevent the zinc from penetrating the full length of the socket basket, thereby creating a void that would collect moisture after the socket is placed in service.

The zinc has to be poured at a temperature of 950° F. to 1000° F. (well below the boiling point of 1665° F.). Another word of caution is that overheating of the zinc may affect its bonding properties. The pouring of the zinc is in one continuous stream until it reaches the top of the basket and all wire ends are covered. After the zinc, cable and socket have cooled to a point where they can be easily handled, the serving band is removed from the socket base. It is good practice to lubricate the rope. Wire rope lubricant is applied to the rope at the base of the socket.

Spelter sockets with zinc have several problems, especially for forming a termination connector on a magnetic influence minesweeper cable. One challenge is that conventional spelter sockets are conductive, and don't lend themselves to large wire ropes, which have a very high heat capacity, and therefore the zinc will cool quickly resulting in a weak bond. In use, electric current flows through the magnetic influence cable, and the conductive socket potentially can drain off some of the cable's current and drain current from the ambient electrified salt water. Also, from the prior art discussion one can understand that the process of forming a zinc spelter socket does not lend itself to shipboard repairs.

SUMMARY OF THE INVENTION

The invention provides a compact, corrosion resistant termination connector that can securely connect to an end of a metallic wire strand rope, such as the strength member of a minesweeping cable. The termination connector isolates the end of the metallic wire rope from an electric current and a corrosive environment such as salt water and air. The termination connector also has fastening elements for attaching a modular fitting to the termination connector. The modular fitting is selected to provide a specific function, such as an attachment point with load shearing capability. The termination connector can be fitted with a molded polymeric covering extending contiguously from the termination connector to an attached metallic wire rope. The molded polymeric covering provides insulating protection for the metallic wire rope by isolating it from the environment.

The termination connector is particularly suited for use on the end of a coaxial cable with a core strength member, where the strength member in one variation is a steel wire rope. The cable cart for example be a minesweeping cable, which is also fitted with an acoustic generator and an acoustic sensor. The acoustic generator produces sound that simulates the noises generated by a ship. The acoustic sensor is a sound detector, for instance for detecting sounds generated by a ship or torpedo.

The termination connector is fitted with a modular fitting having a pin to provide load shearing capability. The pin is selected to shear, for example if the cable becomes snagged or entangled in detritus causing an increased load. Without load shearing the minesweeping cable could be severely damaged by an additional load on the cable. In the case of an aircraft deploying an open loop sweep, the loop will shear open, thereby preventing catastrophic damage to the aircraft.

The termination connector is relatively narrow, smooth, and hydrodynamic. The termination connector produces little incremental hydrodynamic resistance when pulled through the water. A molded insular covering adds further smoothing as well as sealing. The covering is typically composed of a resilient rubbery material, and its density is lower than the density of the steel wire rope. The molded covering does not provide flotation, enabling the minesweeping cable to sink in the salt water.

The termination connector includes a connector body that typically is composed of a high strength composite material, or stainless steel in some cases. The connector body includes a channel having an entrance with a cross-sectional diameter larger than the thickness of the steel rope, where the connector body has three sections: a first section that is a ribbed annular stem with a substantially circular entrance port that has a cross-sectional diameter that is larger than the thickness of the steel rope; a second section that is substantially an abutment band with a smooth surface and uniform edges for creating sealing occlusions and a widening channel; and a third section that is an elongate externally threaded spelter socket with a fully widened conical channel.

A connection with the steel strand rope is formed by threading the steel rope through the entrance of the channel of the first section, through the second section, and into the third section, where the channel completes expansion into a wide conical channel. In the cone of the spelter socket the strands of the rope are splayed, substantially filling the conical channel of the spelter socket, such that on adding a reactive liquid mixture of thermosetting resins to the spelter socket the strands of the steel strand rope are completely covered and are adhered into a solid conical, mass as the thermosetting resins cure, where the conical mass is a circular wedge. After the wedge is fully cured, the molded insulating covering can be added. The molded insulating covering is molded around the steel strand rope, around the ribbed stem and in the channel (if room permits). The insulating covering is substantially sealedly flush with an edge of the band of the termination connector.

As previously discussed, the termination connector can have a modular fitting, where the modular fitting includes a hook, a shackle, a sheave, a shear pin, a thimble, and other device. The modular fitting is screwed on the elongate externally threaded spelter socket, where the modular fitting has an elongate internally threaded cylindrical section that when screwed on the spelter socket a rim of the cylindrical section is substantially flush with an opposing edge of the band. The internally threaded cylindrical section can have a pair of opposing rounded protrusions, each protrusion having a medial hole, where the pair of opposing rounded protrusions have a connecting load shearing pin, for instance for a thimble, where the load shearing pin is held in position by a retainer clip, such as an e-clip. The modular fitting reinforces the elongate externally threaded spelter socket, and when tension on the steel wire rope is created the tension is translated to the wedge. The modular fitting screwed on the termination connector adds to the total force that the termination connector can handle before failing. The modular fitting also protects the connector body from exterior physical damage.

The termination connector provides environmental and electrical isolation of the wire rope from the surroundings, including light, salt water and air. When immersed in salt water in an open loop sweep, the surrounding water carries a current between electrodes, and this environment is potentially very corrosive. The molded insulating covering isolates the wire rope from the electric current. The signature electromagnetic field generated by the influence magnetic mine sweep cable will pass through the covering, but the steel wire rope is not in contact with any substance with which it will react, and the steel wire rope is substantially unaffected by the electromagnetic field or subsequent galvanic corrosion. In addition to the magnetic field, the termination fitting electrically isolates the steel wire rope from stray current generated by the coaxial electrodes to the surroundings (i.e. seawater).

Advantages and new features of the invention include the use of a high strength composite body that electrically and environmentally isolates the metal wire rope from its surroundings, and therefore the rope doesn't corrode. Under these conditions, even galvanized steel will corrode if not isolated. The spelter type socket preserves 100% load efficiency within the wire rope. Embedding the splayed wire rope strands in the cured polymeric solid conical wedge in the termination connection isolates the strands, such that they are corrosion resistant. A metal spelter would not provide this level of corrosion resistance. The ribbed stem section of the connection body provides a restraining, substantially water tight, interference fit surface for attaching the molded wire rope insulating covering. The water tight insulating covering augments the isolation of the wire rope from the surroundings.

The elongate externally threaded spelter socket allows for a large distribution of load around the socket section and spreads the force into the band section, which is thicker. Additionally, the threaded spelter socket on the connection body allows for a wide variety of compact modular fittings, as exemplified by the one disclosed in the illustrated application, where the modular fitting provides for a load shearing pin and round thimble (for synthetic rope attachment). Damaged fittings can be easily replaced if necessary.

BRIEF DESCRIPTION OF THE DRAWINGS

The invention will become readily apparent by referring to the following detailed description and the appended drawings in which.

DETAILED DESCRIPTION OF THE INVENTION

Figure 1:
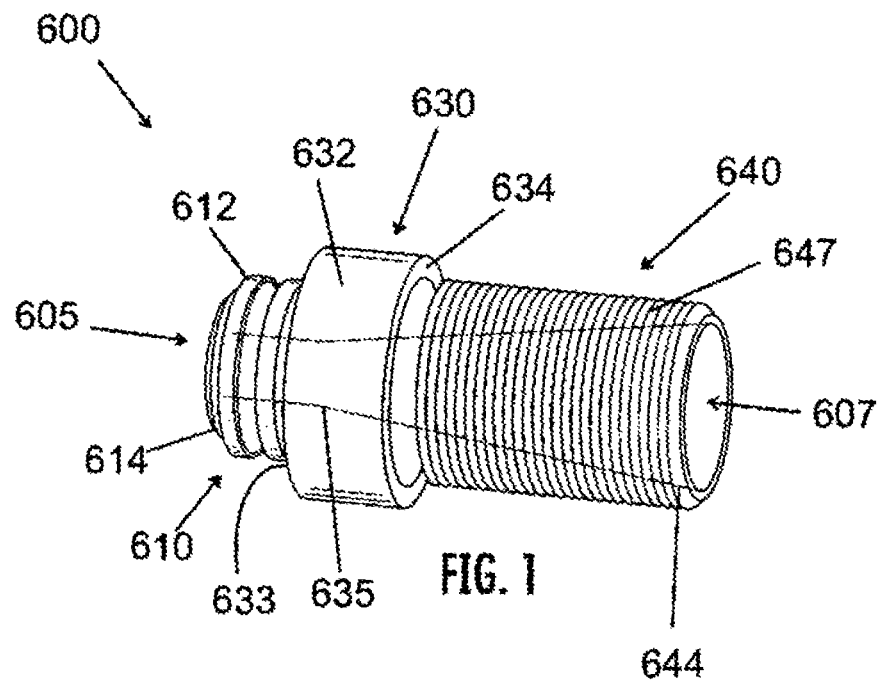
FIG. 1 is a side perspective view of a termination connector, wherein the termination connector is illustrated as being translucent for the purpose of better understanding the illustrated elements of the invention.

The illustrated invention is a compact, corrosion resistant termination connector that can securely connect to an end of a metallic wire rope, where the termination connector isolates the end of the metallic wire rope from electric currents and corrosive environments, such as salt water and air. As shown in FIG. 1, the termination connector 600 has three sections. The first section 610 is a ribbed annular stem 612 with a channel 605 with a substantially circular entrance port 614 that has a cross-sectional diameter that is large enough to accommodate the steel wire rope 14 (shown in FIG. 4). The second section 630 is substantially an abutment band 632 with a smooth surface and uniform edges 633,634 for creating sealing occlusions and a widening channel 635. The third section 640 is an elongate externally threaded spelter socket 647 with a fully widened conical channel 644. The fully widened conical channel 644 of the spelter socket 647 is accessed through the open end 607 of the spelter socket 647.

The exemplary termination connector 600 is composed of a high strength composite material, for instance fiberglass. The high strength composite material is discussed in more detail later.

Figure 4:
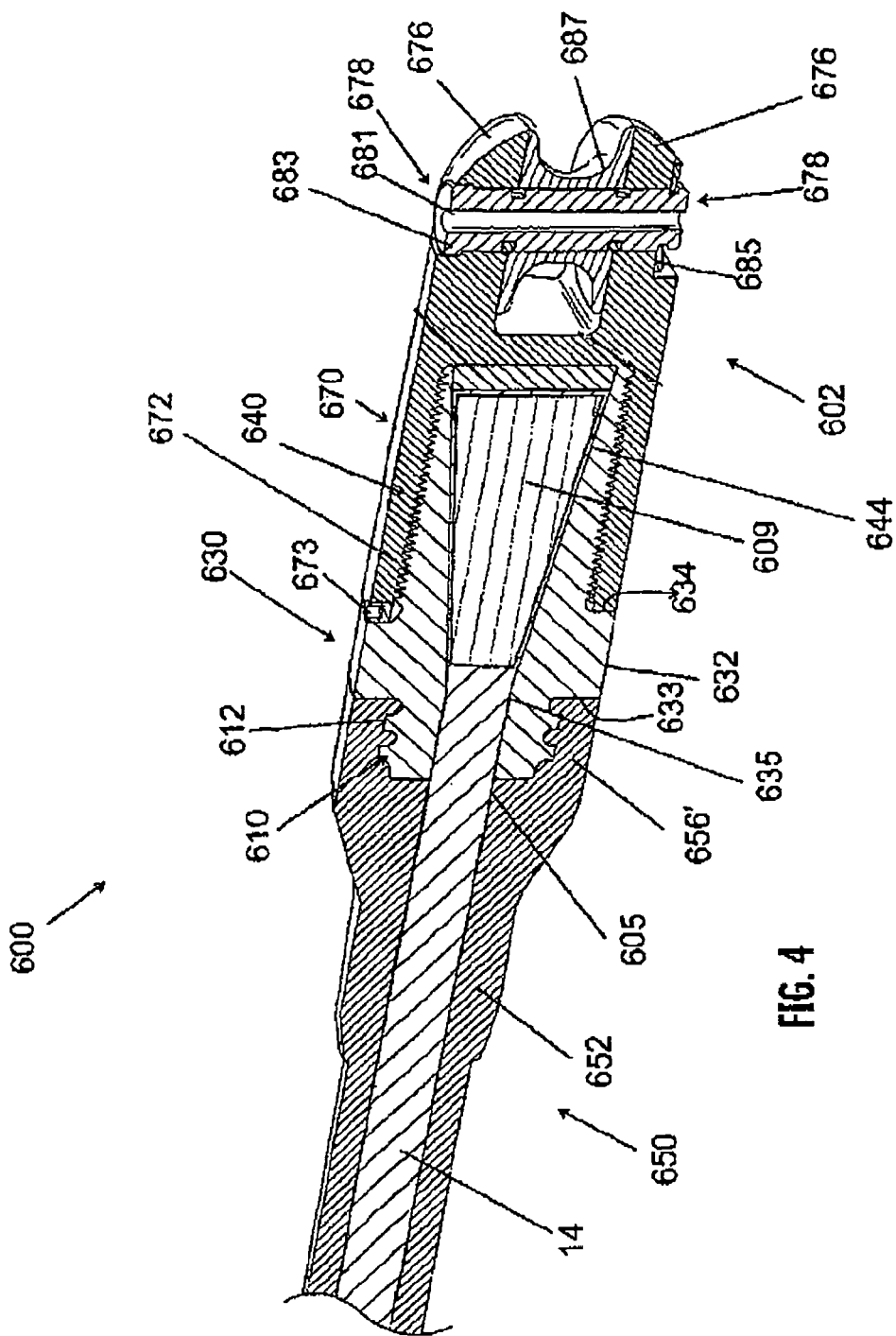
FIG. 4 is a longitudinal cross-sectional perspective view of the termination connector shown in FIG. 3, illustrating the end of the wire rope, where the strands of the wire rope are immobilized in a wedge in a conical channel of the spelter socket, wherein the wedge has splayed strands that are adhered with a thermosetting resin, and where the modular fitting has a load shearing pin that is securing a round thimble.
Figure 6:
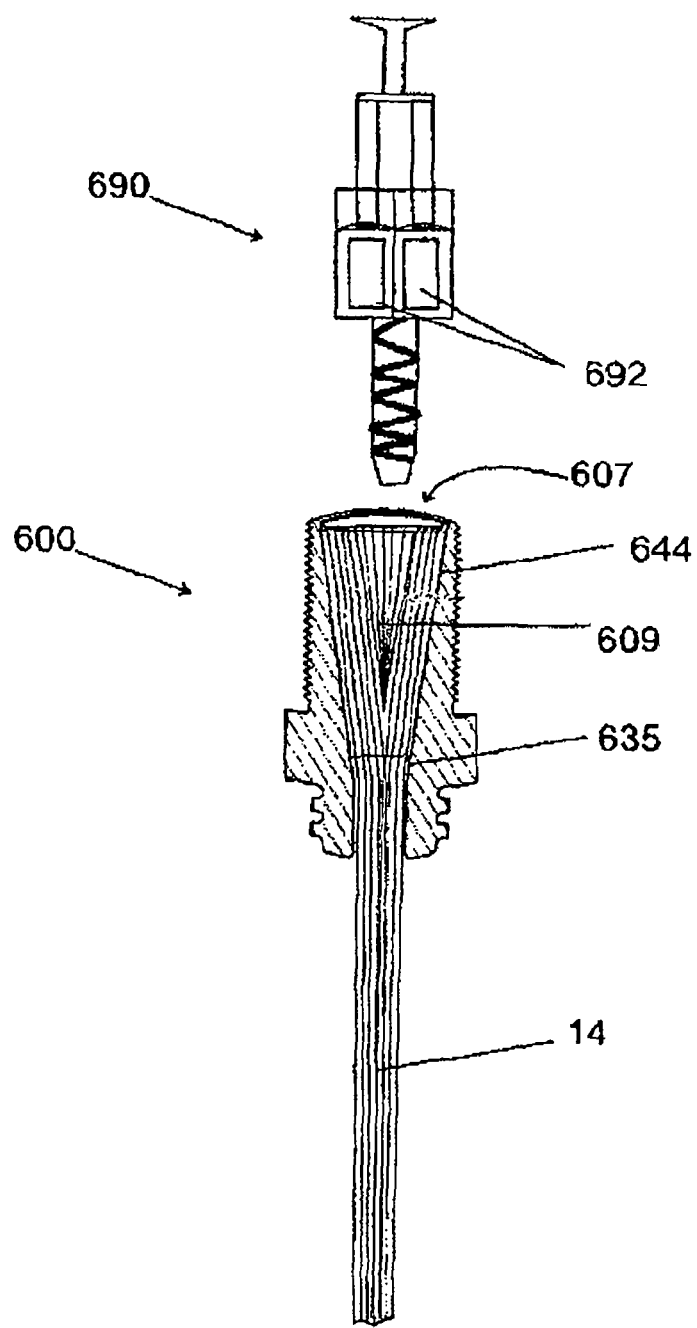
FIG. 6 is a cross-sectional view of the end of the strength member of a magnetic minesweeping cable being fitted with the termination connector using a mixture of thermosetting resins extruded and statically mixed from an applicator.

FIG. 6 and FIG. 1 illustrate how a connection with the metallic rope 14 is formed, where the illustrated metallic rope 14 is a steel wire strand rope. The steel rope 14 is threaded through the entrance port 614 of the first section 610, into the channel 605. Threading continues past the second section 630, where the channel starts widening 635, and into the fully widened conical channel 644 of the third section 640. Individual strands of the rope are splayed, substantially filling the conical channel. 644 of the third section 640. Any rope covering material, such as a separator or other residual materials are removed from the portion of rope 14 that is inside termination connector 600. With the termination connector 600 held upright, a mixture of thermosetting resins are extruded and statically mixed. In FIG. 6, there is an applicator 690 having a pair of barrels 692. Each barrel contains one of the reactive resins, and the mixed blend of resins is added through the top, or open end, 607 of the conical channel 644. On adding the reactive liquid mixture of thermosetting resins to the spelter socket 647 the strands of the steel wire strand rope are adhered into a solid conical wedge 609 as the thermosetting resins cures. A fully cured solid conical wedge 609 is illustrated in FIG. 4.

Alternatively, a mixture of thermosetting resins with reinforcing fillers can be prepared, where the reactive resins are premeasured and then admixed in a vessel, such as a cup, forming an activated viscous mixture of resins. The activated mixture is then transferred into a single barrel syringe and extruded into the socket. Solid components, such as fibers of glass or Kevlar™, a product of DuPont, or polyester or a metal, gritty crystals such as silica, and powders are more easily handled with this technique.

Exemplary of a reactive liquid mixture of thermosetting resins is an epoxy resin and a curing resin, and a free radical initiated mixture of thermosetting resins (i.e. styrene and polyesters and peroxide) that are activated. More examples are given later.

Figure 2:
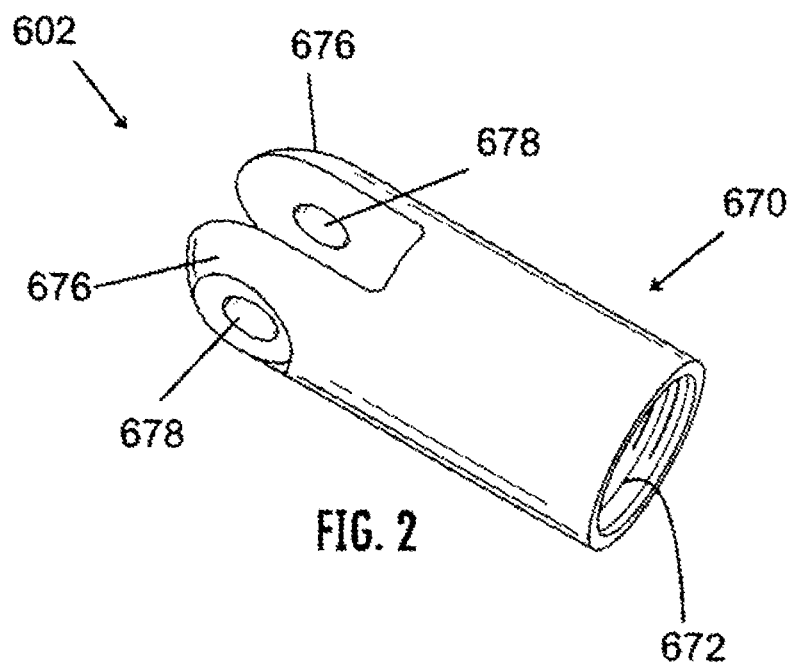
FIG. 2 is a perspective view of a modular fitting for the termination connector, where the modular fitting can be screwed onto the termination connector illustrated in FIG. 1.
Figure 3:
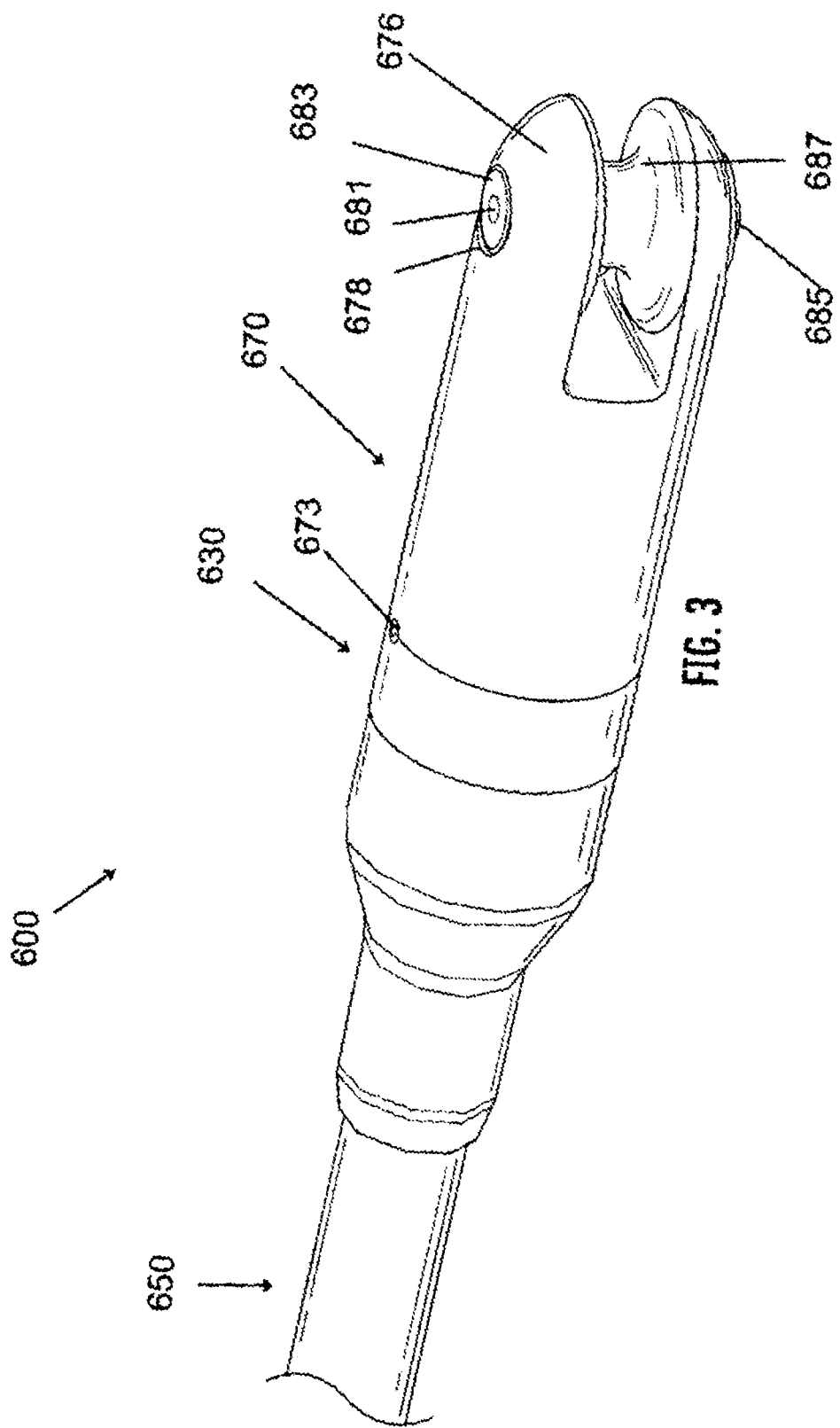
FIG. 3 is a perspective view of the termination connector attached to an end of a steel wire rope, where the steel wire rope is covered by a molded insulating covering, and a modular fitting is screwed on a spelter socket section of the termination connector.

FIG. 2 illustrates a modular fitting 602 that is screwed on the elongate externally threaded spelter socket 647 of the termination connector 600, where the modular fitting 602 is elongate, internally threaded, and cylindrical. The illustrated modular fitting 602 is made of stainless steel. The modular fitting 602 is typically screwed on the spelter socket portion of the third section, so that the modular fitting 602 is substantially flush with edge 634 of the band 632. The modular fitting 602 has a cylindrical section 670 with internal threads 672. Extending from the cylindrical section 670 is a pair of opposing rounded extended protrusions 676, each protrusion having a medial hole 678, and the pair of protrusions are separated by a gap. Referring to FIG. 4, the medial hole 678 on one extended protrusion 676 accommodates a head 683 of a load shearing pin 681 and the medial hole 678 on the other protrusion 676 accommodates a retaining clip 685. E-clips allow quick attachment if the user has the correct tools. A round thimble 687 enables some rotation, and is excellent for attaching a non-metallic line. A couple of examples of a non-metallic line are polyester line and Nylon line. A set screw 673 prevents the modular fitting 602 from working loose from the termination connector 600.

Figure 5:
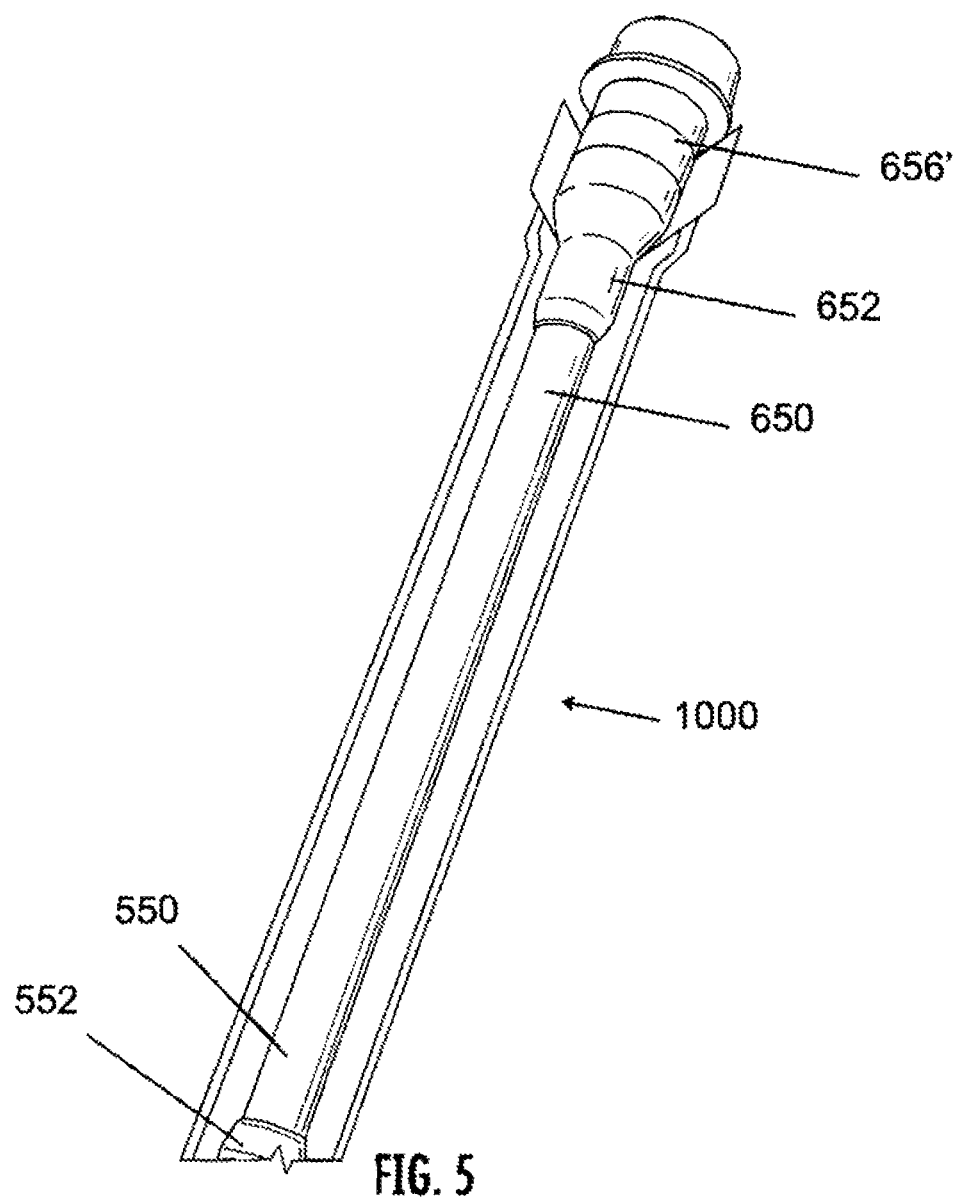
FIG. 5 is a perspective view of the termination connector attached to the steel wire rope onto which has been molded the insulating cover, where the insulating cover has a thicker region that provides flex support bending of the rope.

As shown in FIG. 4, an insulating covering 650 is molded around the steel strand rope 14, around the ribbed stem 612 of the first section 610, such that the insulating covering 650, is substantially sealedly flush with the edge 633 of the band 632 of the termination connector 600. The insulating covering 650 is typically molded using a molded polymeric material, like a urethane oligomer that is cured in a mold 1000 (see half mold 1000 of FIG. 5 and FIG. 7). The region of the insulated covering that covers the ribbed annular stem adjacent to the band 630 is labeled 656'. There is a thicker region 652 that prevents sharp bending of steel strand rope 14. Referring to FIG. 5, the insulated covering 650 has an opposing end 550 for an adjacent cable connector (not shown), with another thicker region 552 associated with the adjacent connector, where the other thicker region 552 also prevents sharp bending.

Figure 7:
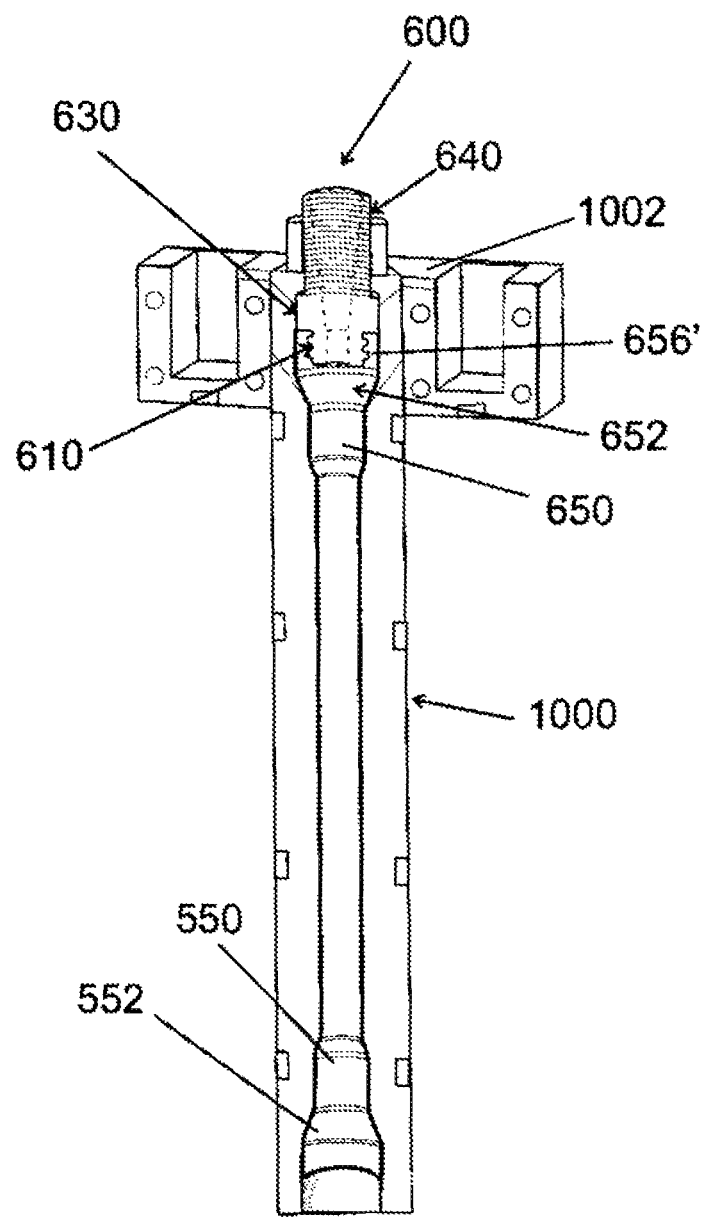
FIG. 7 is a planar partial cut-away view of a half-mold for molding the insulating cover onto the termination connector and the attached steel wire rope, wherein a portion of the insulating cover is cut-away to illustrate how the ribbed annular stem and the band sections of the connecting body are sealed and flush.

In FIG. 7, a portion of the insulating covering 650 has been cut-away in the illustration from the terminal connector 600, in order to show the first section 610. The second section 630 is flush with insulating covering 650 covering the ribs. The portion of the insulating covering 650 adjacent to the band 630 is labeled 656'.

The mold 1000 has blocks 1002 that align the termination connector 600 and hold the steel wire rope (not shown) taut, so that it is straight and centered in the insulating covering 650. Blocks 1002 provide inlets and outlets for the molding material of insulating covering 650. The insulating covering extends to the adjacent connector (not shown), which is swaged-on the coaxial cable with the steel wire rope 14.

Figure 8:
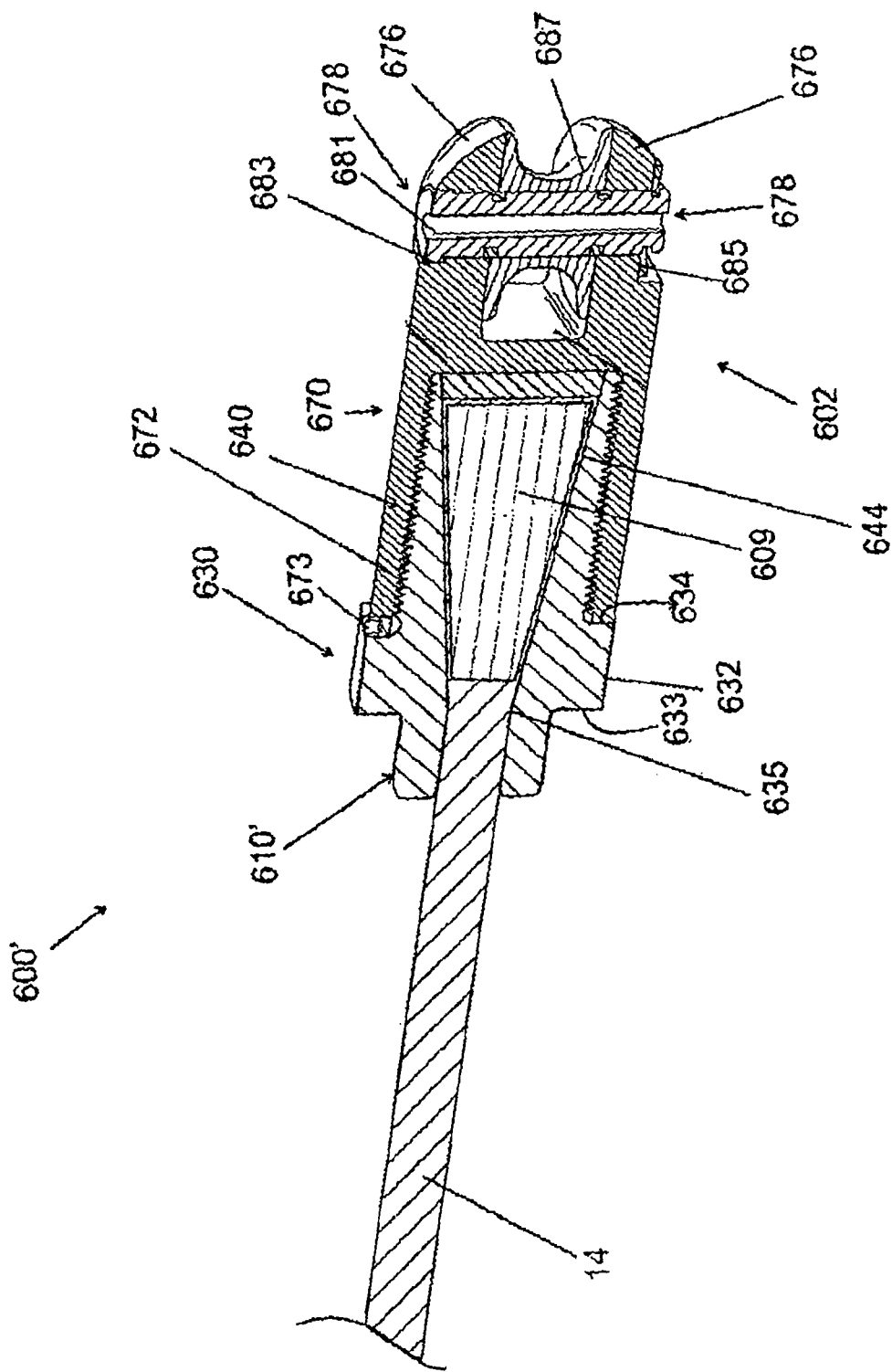
FIG. 8 is a longitudinal cross-sectional perspective view of a stainless steel termination connector having a modular fitting, wherein the short first section of the stainless steel termination connector is not ribbed, having only an annular stub, for applications where there is no need for an insulating cover to protect the terminated strength element.

Another variation of the termination connector 600' is illustrated in FIG. 8. In the illustrated embodiment, the first section is an annular stub 610', because in the anticipated applications the strength member is not protected with an insulating covering and, therefore, the annular stem, or stub 610', does not need to be ribbed. In all other respects except for the material used, the alternative connector 600' is similar to connector 600, as previously described, and the sections/components are identified by like numbers in FIG. 8.

The alternative termination connector 600' is selected for a steel strand rope having a known thickness. The termination connector includes a connector body with a common channel. The connector body is composed of stainless steel, and it has three sections: A short first section 610' that is the annular stub with a circular entrance port that has a cross-sectional diameter that is larger than the thickness of the steel rope; a second section 630 that can function as an abutment band with a smooth surface and a uniform edge; and a third section 640 which includes an elongate externally threaded spelter socket with a fully widened conical channel 644. In the second section, the common channel starts widening 635. The fully widened conical channel 644 in the third section is sometimes referred to as a basket. In the fully widened conical channel 644, a connection with the steel strand rope 14 is formed by threading the steel rope through the entrance port of the short first section 610', past the second section 630 and into the fully widened conical channel 644 of the third section 640, where the strands of the rope are splayed, nearly filling the conical channel of the spelter socket, such that on adding a reactive liquid mixture of thermosetting resins to the spelter socket the strands of the steel strand rope are adhered into a solid conical mass as the thermosetting resins cure.

In the illustrated embodiment the thermosetting resins are selected from epoxy based materials, and particularly mixtures that will cure at room temperature and are relatively fluid. There are a variety of twin barrel systems which mix as they are extruded through a static mixer or alternatively premixed and extruded from a single barrel applicator. The Applicant recognizes that a number of other thermosetting resins potentially could also be suitable, typically though not as easily mixed. For instance, fiberglass resins may be used when properly initiated with a small volume of initiator, such as benzoyl peroxide and methyl ethyl ketone peroxide, where the fiberglass resins typically have acrylic resins and finely chopped glass fibers. Initiated fiberglass resins will cure relatively fast at room temperature, and they bond with many high strength composite materials. Other examples include a composition of acrylic resins with a photosensitive initiator, where the composition has the advantage that it can be cured in a matter of seconds with UV light. Other candidate reactive thermosetting resins include melamines, urethanes, cyanoacrylates and various organo-boranes in conjunction with acrylic oligomers, diluents, and monomers.

It is anticipated that in addition to molded polyurethanes, other materials suitable for forming the insulating cover 650 include ethylene-propylene-diene-monomer (EPDM), such as Santoprene™ owned by Exxon-Mobile, styrene-butadiene rubber (SBR), butyl rubber, chlorosulfonated polyethylene rubber (Hypalon™ owned by DuPont) and polychloroprene (Neoprene™, also by DuPont) can be used as in the insulation. Santoprene is an extrudable in-situ cross-linking EPDM rubber that can be recycled. Kraton™ elastomers by Shell are block copolymer rubbers that also are extrudable, recyclable and have excellent weathering properties. Silicone rubbers are considered by many as being the best rubber, as they are well known as being excellent electrical insulating rubbers that are resistant to oxidation. These products, some of which are rated for continuous service at 260° C. (500° F.), also provide exceptional low-temperature toughness, plus unique adhesion and flame resistance. Whatever the choice of material for the insulating cover 650, a molded rubber is typically compounded with additives such as antioxidants, fillers, reinforcing agents selected from silicates, carbon blacks, clays, carbonates and other finely ground materials, and curing agents to achieve the desired properties.

Some approximate dimensions can be useful for the utilization of the termination connectors on magnetic influence minesweeping cables. In the exemplary embodiment illustrated, the overall diameter of the termination connector 600 is about 1.25 inches, the steel rope covered with the insulating covering is about 0.63 inches thick, and the steel wire rope alone is about 0.32 inches thick, so at its thickest point in the thicker region 652 of the molded insulating covering 650, the insulating covering is approximately 0.5 inches thick.

The termination connector is particularly suited for use on a magnetic influence minesweeping cable having an anti-vibration line attached to a swivel. The termination connector is connected to an extended core strength member of the cable, where the strength member is a steel wire rope 14 that trails behind a towing vessel or aircraft. In the typical application, the steel wire strand rope 14 extends a little more than one and a half feet beyond an aft electrode fitted with an aft connector. The termination connector 600, including the modular fitting 602 is connected to the last few inches of the end of the steel wire strand rope.

In the exemplary embodiment, a magnetic influence cable is terminated with the invented termination connector 600 having a modular fitting 602 which is fitted with thimble 687. The termination connector 600 is typically connected to an anti-vibration rope. The anti-vibration rope is connected to a break-away swivel, and is typically whipped and/or weaved onto itself. The anti-vibration rope is typically connected to an acoustic device. The anti-vibration rope is selected to be strong, yet have some give. Nylon line meets both of these requirements, and Nylon is a poor electrical conductor, so it serves as a good transition line between the magnetic influence cable and the break-away swivel.

The disclosed e-clip 685 on the modular fitting 602 enables the pin 681 to be pulled, and the thimble 687 to be removed, and loaded back in the modular fitting 602 quickly and without a lot of tools. The quick-connect feature of the modular fitting makes it ideal for other applications, such as on out-riggers, self tensioning buoy lines, flag pole lines, logging applications, zip lines, and power lines. The dimensions in these applications should be adjusted to meet the engineering requirements.

The termination connector including the modular fitting is relatively narrow, smooth, and hydrodynamic, offering little resistance when pulled through the water. The molded insular covering adds further smoothing as well as sealing.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A termination connector for a steel strand rope having a thickness, said termination connector comprising:
   a connector body with a common channel, wherein said connector body is composed of a high strength composite material, and wherein said connector body has a first section comprising a ribbed annular stem with a circular entrance port having a cross-sectional diameter that is larger than the thickness of the steel rope, a second section having a widening channel and an abutment band, and a third section comprising an elongate externally threaded spelter socket with a fully widened conical channel;

wherein said abutment band has first and second edges, each of said first and second edges having a smooth surface and uniform edges for creating sealing occlusions;

wherein said ribbed annular stem, said entrance port, said abutment band, said widening channel, and said conical channel are axially aligned; and wherein a connection with the steel strand rope is formed by threading the steel rope through the entrance port of the first section, past the second section and into the fully widened conical channel of the third section, where the strands of the rope are splayed within the conical channel of the spelter socket, such that on adding a reactive liquid mixture of thermosetting resins to the spelter socket the strands of the steel strand rope are adhered into a solid conical mass as the thermosetting resins cure.

2. The termination connector according to claim 1, further comprising:
a polymeric insulating covering molded around the steel strand rope and around said ribbed annular stem, said insulating covering having one end thereof substantially sealedly flush against said first edge of said abutment band.

3. The termination connector according to claim 1, further comprising: a modular fitting screwed onto said externally threaded spelter socket, said modular fitting having an elongate internally threaded cylindrical section, a rim at one end, and a pair of opposing rounded extended protrusions at an opposing end, said protrusions being separated by a gap and each said protrusion having a medial hole; a load shearing pin extending through said medial holes and across said gap; and a retainer clip coupled to said load shearing pin; wherein said rim is flush with said second edge of said abutment band when said modular fitting is screwed completely onto said spelter socket.

4. The termination connector according to claim 3, wherein said retainer clip is an e-clip.

5. The termination connector according to claim 3, wherein said modular fitting is comprised of stainless steel.

6. The termination connector according to claim 1, wherein said high strength composite material comprises a fiberglass reinforced resin.

7. The termination connector according to claim 2, wherein said insulating covering is comprised of a resilient insulating rubber.

8. The termination connector according to claim 3 further comprising a set screw disposed in said modular fitting adjacent to said rim.

9. The termination connector according to claim 3, wherein at least one of said medial holes has a recess, and said load shearing pin has a head disposed within said recess.

10. The termination connector according to claim 3, further comprising a thimble disposed within said gap and rotatably coupled to said load shearing pin.

11. The termination connector according to claim 2, wherein said insulating covering is comprised of molded polyurethane.

12. A magnetic influence minesweeping cable having a termination connector, comprising:

a connector body with a common channel, wherein said connector body is composed of a high strength composite material, and wherein said connector body has
(i) a first section comprising a ribbed annular stem with a circular entrance port having a cross-sectional diameter that is larger than the thickness of the steel rope,
(ii) a second section having a widening channel and an abutment band, wherein said abutment band has first and second edges, each of said first and second edges having a smooth surface and uniform edges for creating sealing occlusions, and
(iii) a third section comprising an elongate externally threaded spelter socket with a fully widened conical channel, wherein said ribbed annular stem, said entrance port, said abutment band, said widening channel, and said conical channel are axially aligned;

a steel strand rope comprising a plurality of steel strands, said steel strand rope having an end threaded through said entrance port of said first section, through said second section and into said conical channel of said third section, wherein the ends of said steel strands are splayed within said fully widened conical channel; and a thermosetting resin disposed within said conical channel and encompassing said splayed ends of said steel strands, thus forming a solid conical mass when said resin cures into a solid state.

13. The magnetic influence minesweeping cable of claim 12, further comprising:
a polymeric insulating covering molded around said steel strand rope and around said ribbed annular stem, said insulating covering having one end thereof substantially sealedly flush against said first edge of said abutment band.

14. The magnetic influence minesweeping cable of claim 12, further comprising: a modular fitting screwed onto said externally threaded spelter socket, said modular fitting having an elongate internally threaded cylindrical section, a rim at one end, and a pair of opposing rounded extended protrusions at an opposing end, said protrusions being separated by a gap and each said protrusion having a medial hole; a load shearing pin extending through said medial holes and across said gap; and a retainer clip coupled to said load shearing pin; wherein said rim is flush with said second edge of said abutment band when said modular fitting is screwed completely onto said spelter socket.

15. The magnetic influence minesweeping cable of claim 14, wherein said modular fitting is comprised of stainless steel.

16. The magnetic influence minesweeping cable of claim 12, wherein said high strength composite material comprises a fiberglass reinforced resin.

17. The magnetic minesweeping influence cable of claim 13, wherein said insulating covering is comprised of a resilient insulating rubber.

18. The magnetic influence minesweeping cable of claim 13, wherein said insulating covering is comprised of molded polyurethane.

19. The magnetic influence minesweeping cable of claim 12, wherein said resin comprises an epoxy resin.

20. The magnetic influence minesweeping cable of claim 14 further comprising a set screw disposed in said modular fitting adjacent to said rim.

21. The magnetic influence minesweeping cable of claim 14, further comprising a thimble disposed within said gap and rotatably coupled to said load shearing pin.

* * * * *